Figure 1:
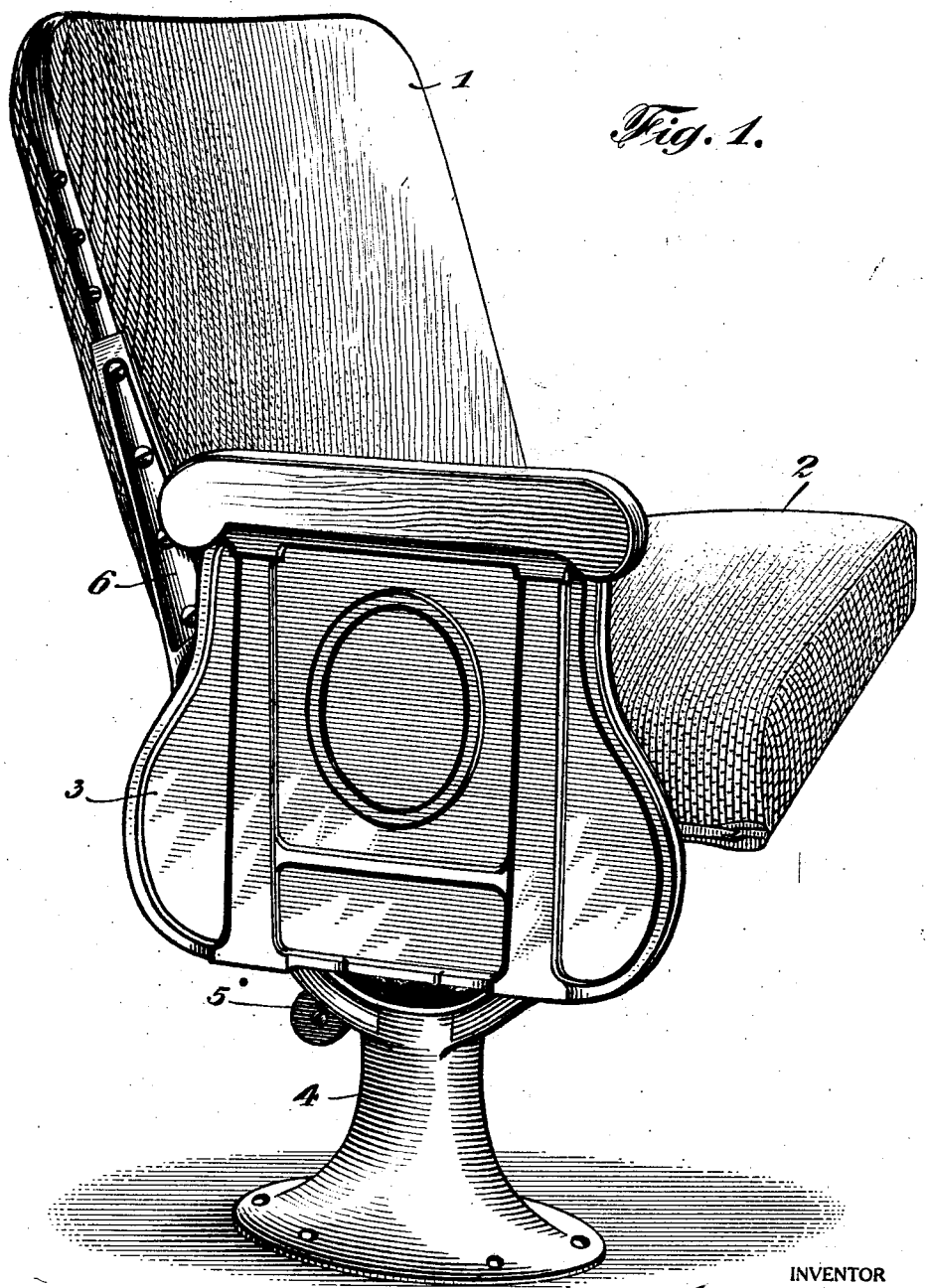

March 16, 1926. 1,577,026
C. T. HANSEN
CAR SEAT
Filed Feb. 19, 1924 8 Sheets-Sheet 1

INVENTOR
Conrad T. Hansen
BY
ATTORNEY

March 16, 1926.   1,577,026
C. T. HANSEN
CAR SEAT
Filed Feb. 19, 1924    8 Sheets-Sheet 2

Fig. 2.

Fig. 2a.

INVENTOR
Conrad T. Hansen
BY
ATTORNEYS

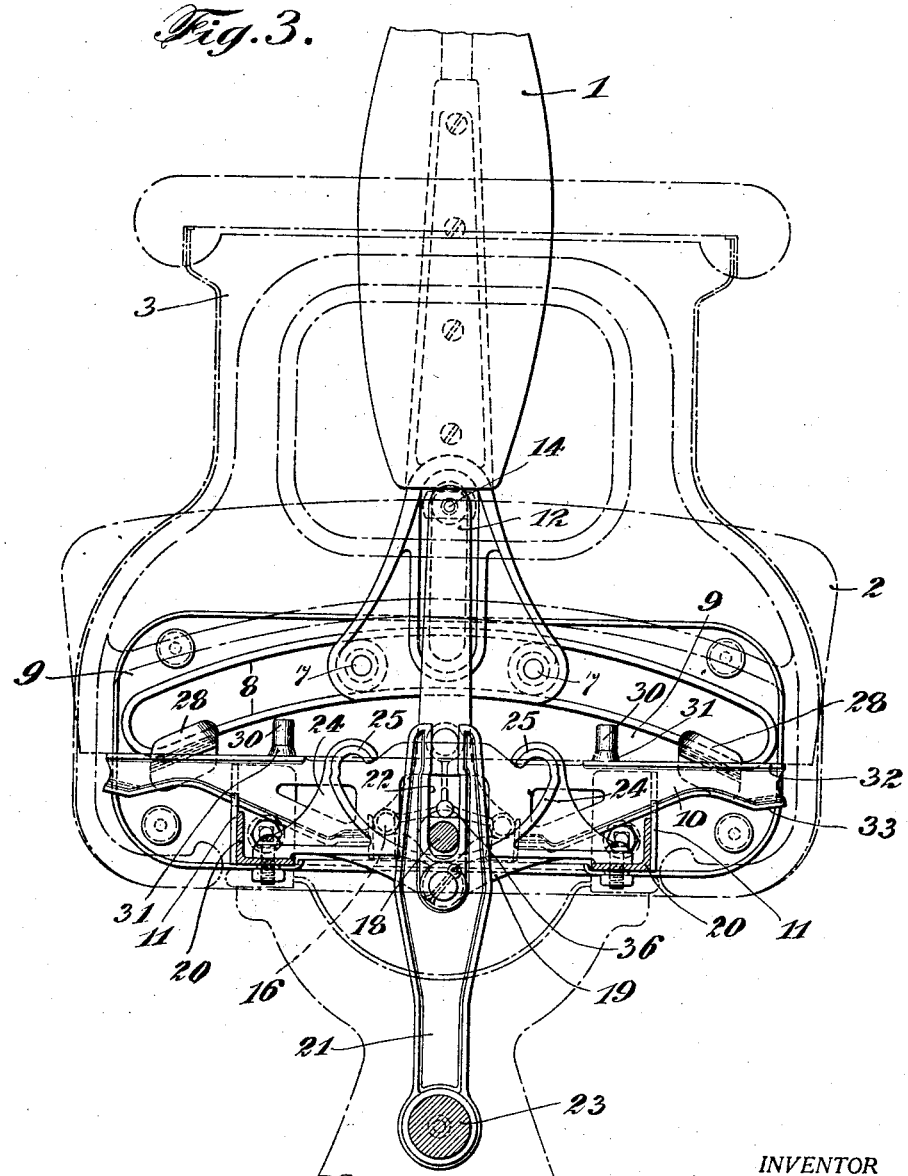

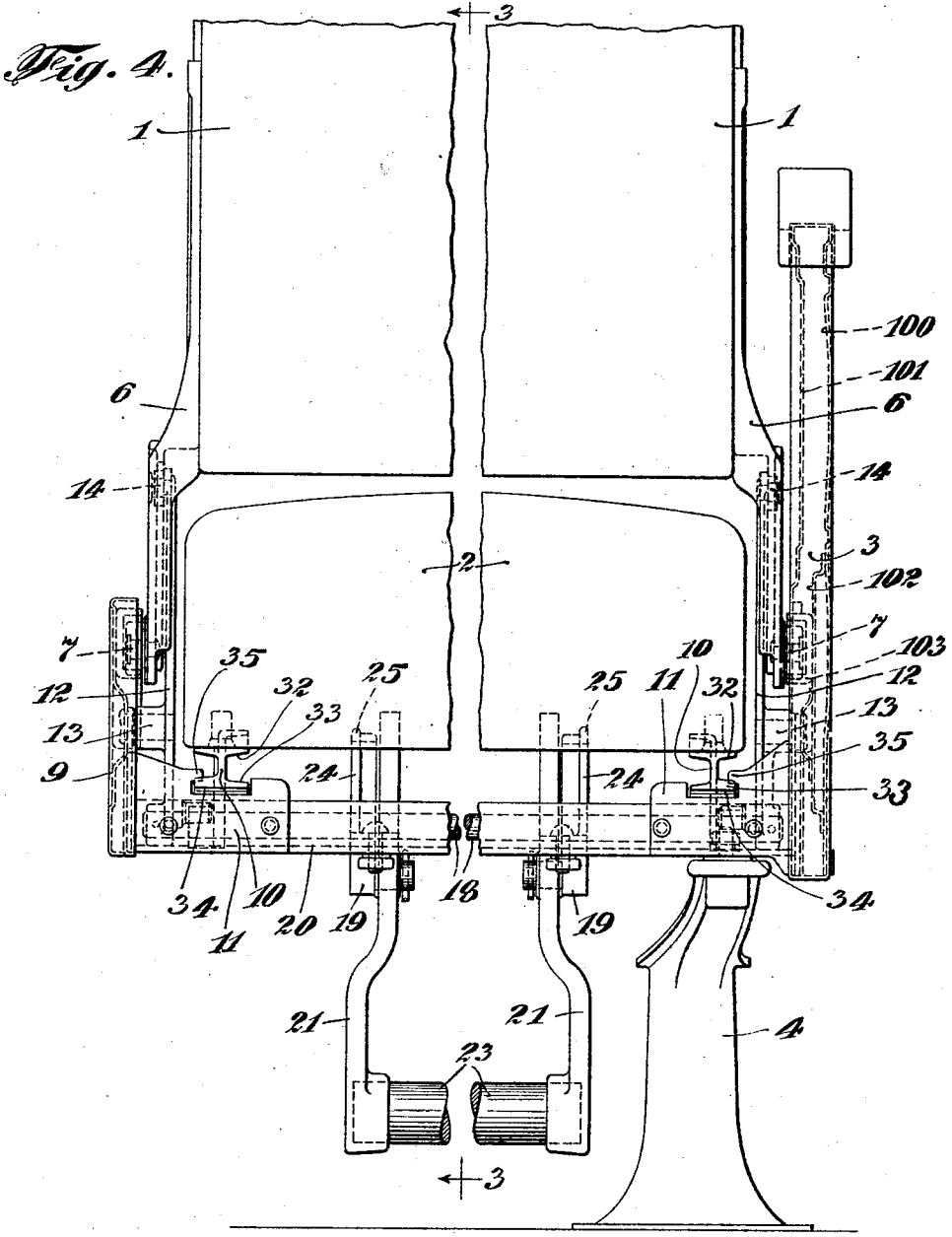

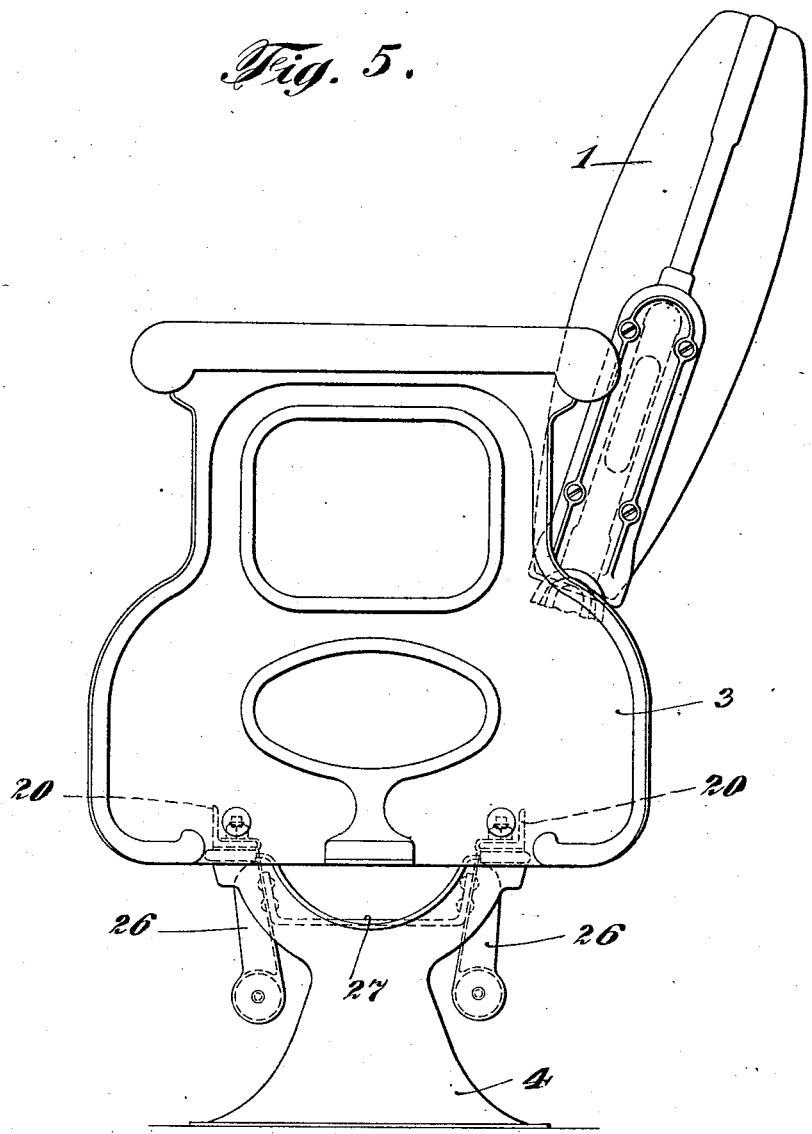

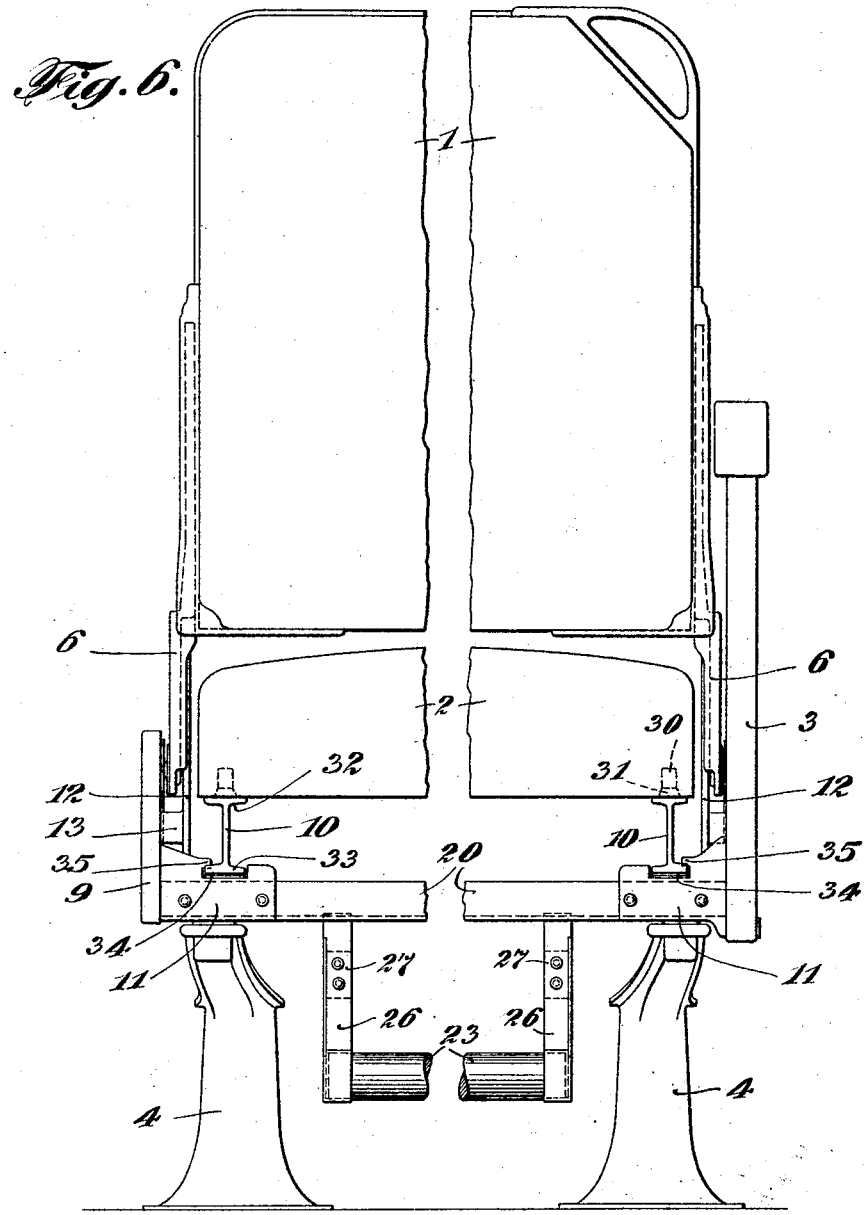

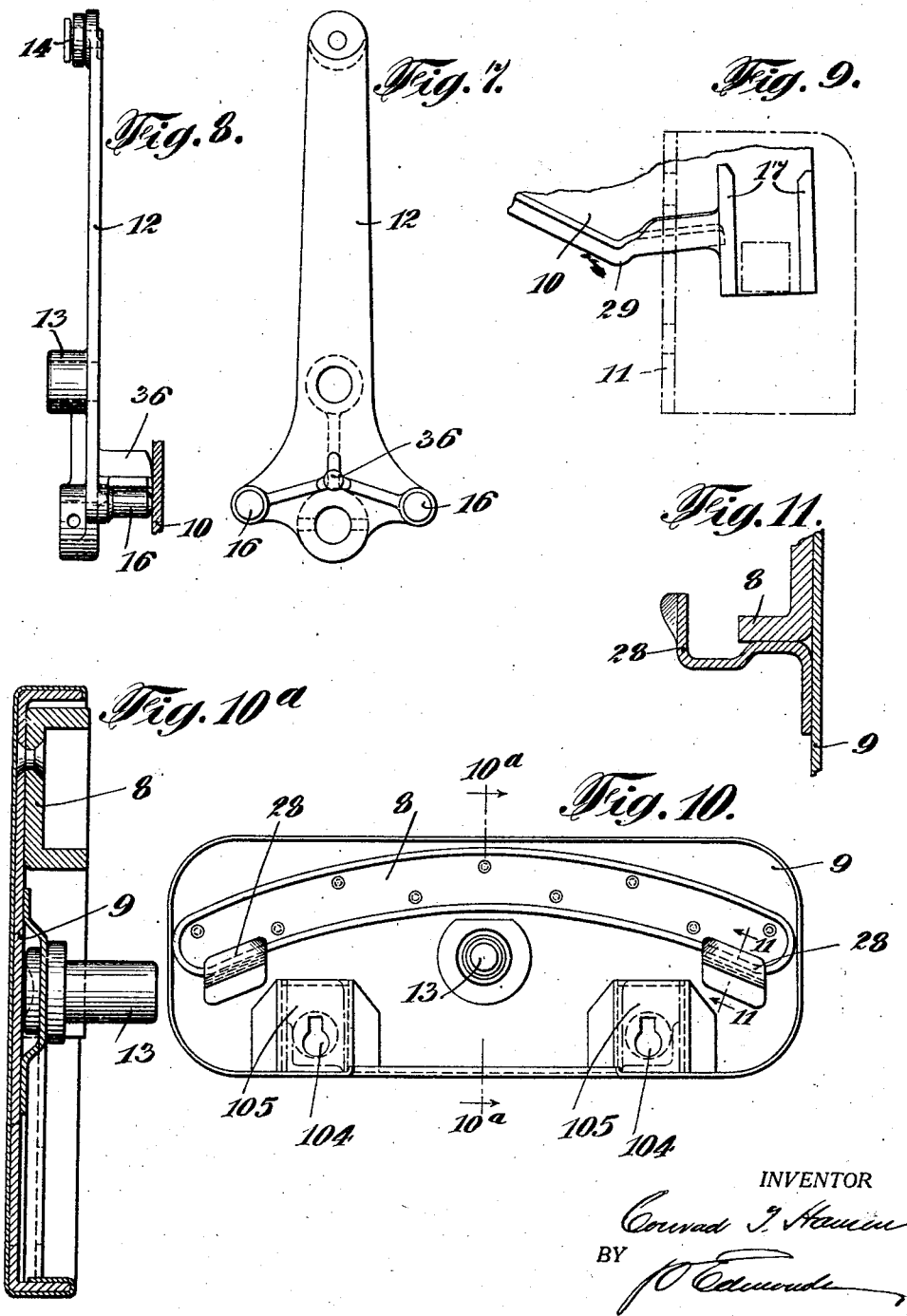

March 16, 1926.
C. T. HANSEN
CAR SEAT
Filed Feb. 19, 1924    8 Sheets-Sheet 8
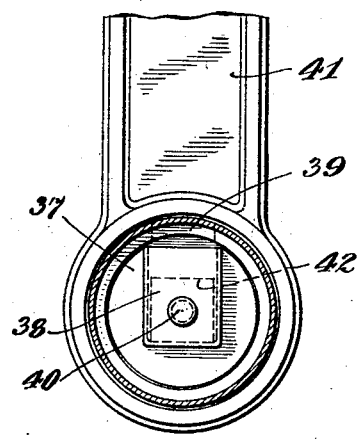
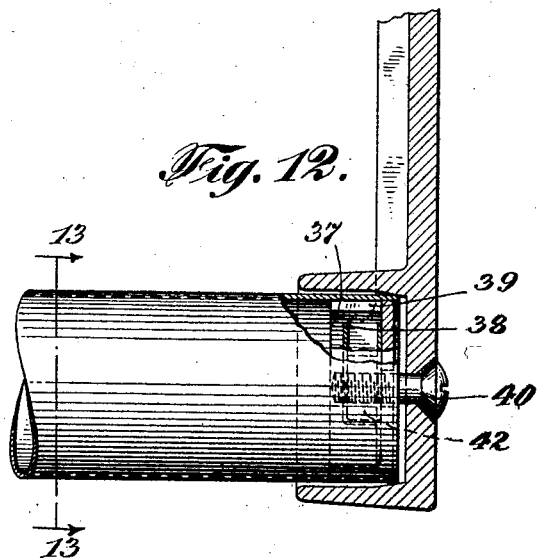
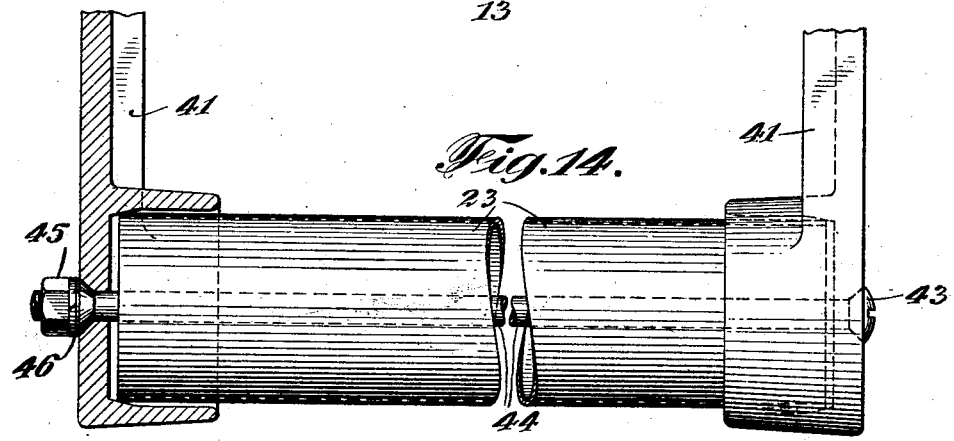
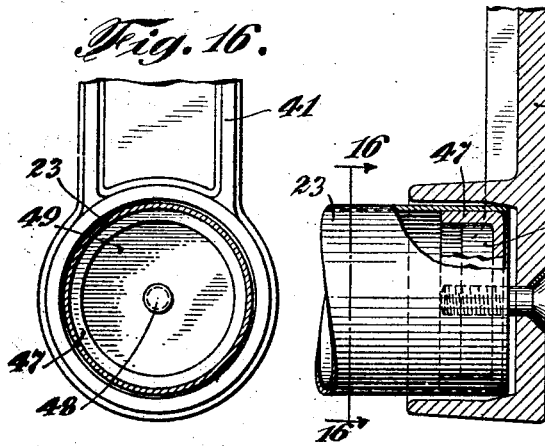
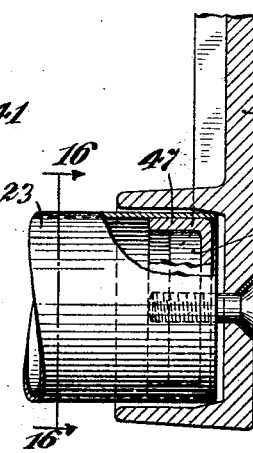
INVENTOR
Conrad T. Hansen
BY
ATTORNEY Patented Mar. 16, 1926.

1,577,026

UNITED STATES PATENT OFFICE.

CONRAD T. HANSEN, OF DETROIT, MICHIGAN, ASSIGNOR TO THE AMERICAN MOTOR BODY CORPORATION, OF PHILADELPHIA, PENNSYLVANIA, A CORPORATION OF DELAWARE.

CAR SEAT.

Application filed February 19, 1924. Serial No. 693,743.

*To all whom it may concern:*

Be it known that I, CONRAD T. HANSEN, a citizen of the United States, residing at Detroit, in the county of Wayne and State of Michigan, have invented certain new and useful Improvements in Car Seats, of which the following is a specification.

My invention relates to car seats, and more particularly relates to car seats in which the seat back may be moved from one side of the seat to the other to reverse the seating direction, the seat cushion being simultaneously and automatically shifted in a reverse direction and so inclined as to give an occupant the desired extent of comfortable seating space, and, if the seat includes a shiftable foot rest, the foot rest being likewise simultaneously and automatically swung toward the rear of the seat into the desired location for use by an occupant of the next seat of the car.

In an application for car seats filed by me March 10, 1922, Serial Number 542,555, I have disclosed car seat construction wherein the shifting of the seat cushion is accomplished through the intervention of throw levers which are pivoted to end plates and which have pin and slot connections with guided back standards and seat rockers of unique construction. The construction also includes a movable foot rest which is shifted upon seat reversal by means of an oscillating rod carried by the throw levers and engaged in slots in pivotally mounted foot rest hangers. My present invention contemplates the use of a somewhat similar general construction, in so far as the movements of the seat cushion, and foot rest if used, are accomplished in a similar manner whenever the seat back is reversed. The principal object of the present invention is to improve upon the said prior construction. Specifically, one of the main objects of this invention is to reduce the number of parts to a minimum and to locate the operating mechanism in an exceedingly small space and to have no part of the mechanism project below the bottom of the cross rails so as to interfere with heater or truss planks under the seat. The objects of my invention also include the substitution for the unique rockers, firmer and stronger shiftable seat rockers of a usual type, which are more firmly and strongly supported and held against side play, thus establishing more positive and stronger support for the seat cushion while, at the same time, not interfering with the easy shifting thereof automatically upon reversal of the seat back, and at the same time permitting the rockers to be readily disassembled from the construction. Another object of this invention is to equip the seat with means which prevent the seat cushion or seat back from being jarred or moved when the seat is occupied, but which, when the seat is unoccupied, do not interfere with the easy reversal of the back nor the accompanying shifting of the seat cushion. Another improvement contemplated is to provide members which engage over the oscillating rod when the seat is in either position of complete reversal, the object being to prevent distortion or flexing of this rod when pressure is placed upon the foot rest. Another object of this invention is to provide means for connecting a tubular foot rail to the hanger members in such a way that the connection is not apt to work loose under the strains and jars of travel and use; and to provide simplified bridge members for supporting the hangers. A further object of this invention is to provide the rockers with improved cushion pins which progressively enter the holes therefor in the seat cushion frame and forestall vibration of the cushion and rattling as the holes become enlarged by wear. A further object of this invention is to provide a light, sturdy, durable and firm, stationary foot rest construction which is firmly supported against becoming loosened or dislodged as a result of use or by the jarring incident to travel. Other objects will be in part obvious and in part pointed out hereinafter.

My invention accordingly consists in the features of construction, combination of elements and arrangement of parts which will be exemplified in the construction hereinafter set forth and the scope of the application of which will be indicated in the following claims.

In order that a clearer understanding of my invention may be had, attention is hereby directed to the accompanying drawings forming a part of this application and illustrating certain possible embodiments of my invention. In the drawings, Fig. 1 is a perspective view of a car seat embodying my invention; Fig. 2 is a sectional view of the same looking toward one end of the seat, and including a movable foot rest, Fig. 2ª repeating a showing of co-operating portions of the rocker and throw lever alone, for clearness; Fig. 3 is a view similar to Fig. 2, but shows the seat in an intermediate position of reversal, this view being taken on the line 3—3 of Fig. 4; Fig. 4 is a front view of the same with the parts in the position shown in Fig. 3, the seat being broken away at the center; Fig. 5 is a side view of a car seat equipped with a stationary foot-rest construction; Fig. 6 is a front view of the same, the seat being broken away at the center; Fig. 7 is a front elevation of an improved throw lever; Fig. 8 is a side view of the same, and includes a fragment of a rocker; Fig. 9 is a side view of a detail of the construction showing a fragment of a rocker associated with the supporting bracket therefor and in a position assumed when the seat is in fully reversed position; Fig. 10 is a front elevation of an armless seat end looking from the inside; Fig. 10ª is a sectional view of the same and is taken on the line 10ª—10ª of Fig. 10; Fig. 11 is a sectional view of a portion thereof and is taken on the line 11—11 of Fig. 10; Fig. 12 shows a preferred manner of connecting a foot rail to a hanger, and shows a fragment of the hanger in section and a fragment of the foot rail partially broken away to show the connection; Fig. 13 is a sectional view of the same and is taken on the line 13—13 of Fig. 12; Fig. 14 shows a modified form of connection between the foot rail and the hanger, certain parts being shown in section and other parts being broken away for the sake of clearness; Fig. 15 shows another modified form of connection between the foot rail and a hanger, the view in other respects being similar to Fig. 12; and Fig. 16 is a sectional view of the same and is taken on the line 16—16 of Fig. 15. Similar reference characters refer to similar parts throughout the several views of the drawings.

Referring to the drawings, the seat comprises a seat back 1, which is reversible from one side of the seat to the other, and a seat cushion 2, which shifts when the seat back is reversed but in a reverse direction. The seat may have a seat end 3 and a pedestal 4 at each end of the seat, or there may be a pedestal only at the aisle end of the seat, and at the other end of the seat a seat end 9 may be attached to a side wall of the car in which the seat is mounted. Foot rest mechanism 5, either stationary or movable, may be included in the construction, if desired.

To each side of the seat back 1 is attached a back standard 6 which is widened at its lower end and there carries a pair of spaced rollers 7, which are supported by and are guided in a channel track 8 provided on the seat ends 3 and 9.

The seat cushion 2 is carried by a pair of seat rockers 10, one of which is adjacent each end of the seat. In a preferred form each rocker 10 is slidably supported on two spaced brackets 11 which are secured to the seat ends 3 and 9.

To effect the simultaneous and automatic reciprocation of the seat cushion when the seat back is reversed, I provide at each end of the seat a throw lever 12 which is pivoted on a pin 13 on each seat end 3 and 9. The upper end of lever 12 carries a pin 14, which is slidably and pivotally engaged in a slot 15 provided in the adjacent back standard 6. The opposite end of each lever 12 has a pin and slot connection with one of the seat rockers. In a preferred form the lower end of each lever 12 is widened and carries two spaced pins 16, and which are adapted to work in spaced flanged slots 17 provided therefor in each seat rocker in such a way that when the seat back is reversed, the pins of the throw lever will work successively in the slots of the rockers and will cause the seat cushion to be shifted a considerable distance in a direction reverse to the movement of the seat back. The riding surfaces of the rockers are pitched to give the desired tilt or inclination to the cushion when fully shifted. An oscillating rod 18 preferably extends between and is connected with the extreme lower ends of the two throw levers 12, which are at opposite ends of the seat.

A preferred form of swingable foot rest construction comprises a pair of bridge members 19 which are secured to and supported by a pair of cross rails 20. A foot rest hanger 21 is pivotally supported intermediate its end on each bridge 19. The upper end of each hanger member 21 has a vertical slot 22 in which the oscillating rod 18 is slidably engaged. The foot rest tube or rod 23 extends between and is secured at its ends to the lower ends of the two hangers 21. Preferably each bridge member 19 is provided with a pair of upwardly extending arms 24 which end in hook portions 25, so positioned and arranged that when the oscillating rod 18 has reached the limit of its swing in either direction, it will engage within the hooks 25 of each bridge member 19. These hook portions of the bridge members thus prevent distortion or flexing of the oscillating rod 18 when pressure is placed upon the foot rest, and the operating parts of the seat will not move or shift by reason of pressure exerted on the foot rail.

The operation of a car seat built along the above lines will be readily apparent. When the seat is reversed in the usual manner by grasping the seat back and moving it from one side of the seat to the other, the throw levers 12 will pivot about the pivots 13 and will cause automatic and simultaneous shifting of the seat cushion and the foot rail.

Instead of providing a shiftable foot rest, a stationary foot rest construction may be employed, if desired. One form of stationary foot rest construction is shown in Figs. 5 and 6 and comprises a pair of foot rest hangers 26 secured rigidly to each connecting rail 20, and a reenforcing and bracing truss 27 extending between and secured rigidly to the front and rear hanger members. The stationary foot rails 23 extend between and are secured to each pair of hanger members.

In order to prevent the standard rollers 7 from leaving the channel track 8 should various of the connections work loose, I prefer to provide on the seat ends 9 metallic guards or retainer plates 28 which have portions adapted to come behind the rear roller when the seat is in either position of reversal and which will thus prevent such roller and consequently the back standard from becoming displaced inwardly of the end plate, as would otherwise be apt to happen if the bolts were not tightened sufficiently or the parts became loosened as a result of use or the jarring incident to travel.

On the under surface of each seat rocker, I preferably provide a pair of projecting corners 29 so positioned that one of these corners will come just beyond one of the brackets 11 when the seat is in either position of complete reversal. The weight of a passenger causes these projections to lock against the brackets and thus prevents the seat cushion from being moved or jarred out of place when the seat is occupied. At the same time, however, the shape of these corners 29 are such that when the seat is not occupied, the corners ride easily over the brackets 11 and do not interfere with the reversing of the seat.

The top of each rocker is preferably provided with cushion pins or dowels 30 which are adapted to seat in recesses provided therefor in the frame members of the seat cushion. These cushion pins or dowels 30 are made with an enlarged beveled base portion 31 which are adapted to enter the holes in the cushion progressively as the holes become enlarged by wear, and thus function to prevent and to forestall vibration and rattling of the cushion on its support even after the holes have become worn.

The seat rockers 10 preferably are made with a thin vertical center portion and with upper and lower laterally flanged portions 32 and 33, the lower flange portions 33 being slidably seated in recesses 34 and beneath tongues 35 provided in the brackets 11, and whereby the seat rockers are located and retained on the brackets against inadvertent displacement, but permitting removal of the rockers when desired.

At its center the rocker has a downwardly open cutaway portion and web portions at each side of this opening, as clearly shown in Figs. 2, 2ª and 3. The throw lever 12 adjacent its lower end may be provided with a centrally located projection 36 which is adapted to bear against the outside surface of one of these web portions of the rocker when the back is in either extreme position, thereby preventing any end play or motion of the seat cushion (see Fig. 2ª). This pin shaped projection 36 is located in such a way as to be clear of the rocker when the seat back and throw lever are in intermediate positions, thus permitting removal of the rocker without disassembling the entire seat (see Fig. 3).

Various means may be employed for connecting the foot rails or rods 23 to any of the hangers. It is necessary that the connection be so made that it will not work loose under the severe strains of usage. As shown in Figs. 12 and 13, a preferred connection consists of welding a cap member 37 within each end of the tubular metallic foot rail 23 and welding a nut pocket 38 on the interior of each cap member 37, the cap member 37 being slotted, as at 39, to permit a nut being dropped into the pocket of each member 38. The connection between each hanger and the rail is made by threading a screw bolt 40 through the hanger member 41 and through the cap member 37 into engagement with the nut 42 which is disposed in the pocket 38. This pocket is preferably so shaped that it will prevent the nut 42 from turning, and thus will prevent the connection from working loose. Defective nuts may readily be removed from the pocket and others substituted. Instead of this construction, however, the foot rail 23 may be connected to the two supporting hangers 41 by means of a single bolt which is long enough to extend through the foot rail from end to end. The head 43 of such bolt 44 will then engage one hanger and its nut 45 may be tightened against the other hanger to secure the parts together. Should the nut 45 work loose in spite of the lock washer 46, the connection may readily and easily be tightened again by merely tightening this nut. Another modification of this connection may consist in merely welding a cap member 47 into each end of the foot rail tube 23 and providing in each cap member 47 a threaded perforation which is adapted to be engaged by a screw bolt, such as 48. The cap member 47, if desired may include a disc like metallic reenforcing member 49 which is welded to the interior thereof and which also presents a threaded perforation for engagement by the screw 48. Each hanger has a cup-shaped portion in which an end of the rail is adapted to seat.

The construction of the seat end at the aisle end of the seat as shown in Fig. 4 comprises an outer panel member 100, an inner panel member 101 and an interior or spider member 102 all rigidly joined together, and the channel track 103 for the back supporting rollers and other parts of the seat are attached to the interior or spider member. This construction of seat end is described and claimed in an application filed by me on January 17, 1924, Serial Number 686,723, for car seats.

A seat end plate having key-hole slots 104 to receive bolts for connecting the cross rail brackets 105 thereto, as shown in Fig. 10, is described and claimed in an application filed by me November 12, 1923, Serial Number 678,577.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In car seat construction, the combination with a pair of spaced connecting rails, end supports for the connecting rails, each connecting rail having secured thereto intermediate said supports a pair of spaced foot rest hangers, truss members extending between and secured rigidly to corresponding front and rear hangers, and each pair of hangers having a foot rail rigidly secured thereto.

2. In a reversible car seat of the character described, the combination with a seat end and a seat back supported for reversal thereon, of recessed rocker supporting members extending inwardly from said seat end, a seat rocker shiftably supported on said members and having a bottom flange seated in the recesses of said members, whereby end play of said rocker on said supporting members is prevented, and a throw lever pivoted to said end plate and having a pin and slot connection with both said seat back and said rocker, said rocker having a pair of spaced projections arranged to ride over said supporting members during seat reversal and to overlap the edges of said supporting members on the sides toward the front of the seat when the seat is in fully reversed position, whereby, under the influence of the weight of an occupant of the seat, the seat cushion, the throw lever and the seat back are restrained from initial movement in seat reversing direction.

3. In reversible car seat construction, in combination, a movable throw lever, and a shiftable seat rocker connected to the throw lever for movement thereby, said throw lever having a projection positioned to come against a side of the rocker when the seat is in either position of complete reversal and thereby preventing end play of the rocker.

4. In reversible car seat construction, in combination, a movable throw lever, and a shiftable seat rocker connected to the throw lever for movement thereby, said throw lever having a projection positioned to come against a side of the rocker when the seat is in either position of complete reversal and thereby preventing end play of the rocker, said rocker being so shaped that it is clear of said projection when said seat is in intermediate positions of reversal.

5. In reversible car seat construction, in combination, a rocker having a vertical web, and a movable throw lever adjacent the rocker and having an inwardly directed projection abutting the outside of the rocker web, whereby the rocker is prevented from outward play.

6. In reversible car seat construction, a rocker having vertical web portions toward each end and a central opening intermediate said web portions, a movable throw lever adjacent the rocker, throw mechanism connecting said lever and rocker, said lever having an inwardly directed projection positioned to be opposite said rocker opening when the lever and rocker are in intermediate position of reversal, permitting movement of said rocker sidewise toward said lever, said projection being positioned to abut the outside of one of said rocker web portions when the rocker and lever are in position of reversal, whereby, in such position of the seat, end play of the rocker toward the lever is prevented.

7. In car seat construction, a tubular metallic foot rail, a hanger member therefor having a cup shaped portion in which an end of said foot rail is adapted to seat, a cap member secured to the end of said rail, aligned bolt holes in said cap member and said hanger, and a bolt extending through said bolt holes, whereby said rail is secured to said hanger, said cap member having a nut pocket member secured to its inner side and arranged to receive a nut for said bolt, and said rail and cap member each having a notch through which said nut may be passed into the pocket of said pocket member.

This specification signed this 15th day of February, 1924.

CONRAD T. HANSEN.